United States Patent
Patzlsperger et al.

(10) Patent No.: US 12,503,238 B2
(45) Date of Patent: Dec. 23, 2025

(54) FASTENING DEVICE FOR RELEASABLE CONNECTION TO A PERFORATED RAIL OF AN AIRCRAFT AND METHOD OF ASSEMBLY

(71) Applicant: TELAIR INTERNATIONAL GMBH, Miesbach (DE)

(72) Inventors: Andreas Patzlsperger, Waakirchen (DE); Wolfgang Lehnert, Miesbach (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 773 days.

(21) Appl. No.: 17/736,756

(22) Filed: May 4, 2022

(65) Prior Publication Data

US 2022/0355936 A1 Nov. 10, 2022

(30) Foreign Application Priority Data

May 5, 2021 (DE) .......................... 102021111609.0

(51) Int. Cl.
*B64D 11/06* (2006.01)
*B64D 9/00* (2006.01)

(52) U.S. Cl.
CPC .......... *B64D 11/0696* (2013.01); *B64D 9/003* (2013.01)

(58) Field of Classification Search
CPC .................................. B64D 9/003; B64C 1/20
USPC ........................................................ 410/104
See application file for complete search history.

(56) References Cited

U.S. PATENT DOCUMENTS

| | | |
|---|---|---|
| 3,334,718 A | 8/1967 | Davidson |
| 3,995,562 A | 12/1976 | Nordstrom |
| 4,230,432 A | 10/1980 | Howell |
| 4,396,175 A * | 8/1983 | Long ................. B64D 11/0696 244/118.6 |
| 4,708,549 A | 11/1987 | Jensen |
| 4,776,533 A | 10/1988 | Sheek et al. |
| 5,169,091 A | 12/1992 | Beroth |
| 5,178,346 A | 1/1993 | Beroth |
| 5,433,550 A | 7/1995 | Huber |

(Continued)

FOREIGN PATENT DOCUMENTS

| | | |
|---|---|---|
| DE | 2556000 | 6/1977 |
| DE | 4216413 | 1/1994 |

(Continued)

*Primary Examiner* — Daniel J Colilla
*Assistant Examiner* — Philip Charles Adams
(74) *Attorney, Agent, or Firm* — Barnes & Thornburg LLP (57) ABSTRACT

A fastening device for releasable connection to a perforated rail of an aircraft and a method of assembly for such a fastening device. The fastening device comprises a housing having at least one locking head portion fixedly connected to the housing, at least one shear pin and an actuating pin. The locking head portion is insertable into a rail hole of the perforated rail and slidable along the longitudinal direction of the perforated rail to a locking position in which the locking head portion engages a slot portion of the perforated rail. The shear pin can be engaged with a rail hole of the perforated rail by axial displacement. The actuating pin is rotatably arranged relative to the housing and connected to the shear pin in such a way that a rotation of the actuating pin causes an axial displacement of the shear pin relative to the housing.

20 Claims, 7 Drawing Sheets

(56) References Cited

U.S. PATENT DOCUMENTS

| | | | |
|---|---|---|---|
| 5,449,132 A | 9/1995 | Gilbert | |
| 8,496,418 B2 * | 7/2013 | Huber | B64D 9/003 410/79 |
| 8,979,450 B2 | 3/2015 | Huber et al. | |
| 9,540,106 B2 | 1/2017 | Huber et al. | |
| 2009/0230241 A1 | 9/2009 | Heller et al. | |

FOREIGN PATENT DOCUMENTS

| | | |
|---|---|---|
| EP | 0581072 | 2/1994 |
| GB | 2267120 | 11/1993 |
| WO | WO 2010/149178 | 12/2010 |
| WO | WO 2010/149179 | 12/2010 |
| WO | WO 2019/074534 | 4/2019 |

\* cited by examiner

FASTENING DEVICE FOR RELEASABLE CONNECTION TO A PERFORATED RAIL OF AN AIRCRAFT AND METHOD OF ASSEMBLY

CROSS REFERENCE TO RELATED APPLICATIONS

This application claims priority to German Patent Application No. 10 2021 111 609.0, filed May 5, 2021. The disclosure set forth in the referenced application is incorporated herein by reference in its entirety.

FIELD OF THE DISCLOSURE

The invention relates to a fastening device for releasable connection to a perforated rail of an aircraft and to a method of assembly for such a fastening device.

BACKGROUND

Standardized perforated rails with T-slot connections are often provided in the lower, main or upper decks of aircraft for mounting seats, cargo system components or other components. These perforated rails are commonly referred to as "seat rails" or, depending on their use, "seat track," "cargo track" or "floor fitting." Such a perforated rail has a number of rail holes spaced apart from one another in the longitudinal direction by a grid dimension, which are connected to one another by rail slots. The grid dimension, i.e., the distance between two rail holes typically designed as holes, is usually 1 inch according to the standard, but may deviate from this in exceptional cases. Frequently, the longitudinal direction of the perforated rail is referred to as the X-direction, the transverse direction as the Y-direction, and the direction perpendicular thereto as the Z-direction. The perforated rails are firmly connected to the aircraft fuselage via a support profile.

Such a perforated rail is shown, for example, in FIGS. 1 and 2 in EP 0 581 072 A1.

In addition to being used to secure passenger seats, perforated or seat rails are also used on aircraft cargo decks to secure cargo. To secure containers and pallets for cargo items, fastening devices such as locks, side guides, etc. are detachably mounted to the perforated rails on the cargo deck to hold containers and pallets in position during transport.

Due to the specified standard dimensions of the perforated rail, the available installation space for fastening devices in the XY-plane is often predetermined. However, the maximum installation height for a fastening device may also be limited in the Z-direction, for example if containers and pallets on rollers must be able to move unhindered across a mounted fastening device on the cargo deck. For certain applications, a maximum overall height of 2 inches is specified.

There are various ways of connecting a fastening device to a perforated rail. Two fundamentally different mounting or locking principles can be distinguished.

In the first locking principle, the fastening device has rotatable tension bolts (Z-bolts) and immovable shear bolts (XY-bolts). The fastening device is inserted into the seat rail from above so that the shear bolts are already engaged with the rail holes and thus at the intended locking position for blocking an XY-movement. The fastening device is then secured in the locked position by rotating the tension bolt 90° in the Z-direction. For safety-relevant applications, a suitable vibration-resistant locking device must be used to prevent the tension bolt from turning back by means of a positive lock. Additional components are required for this purpose, such as spring-loaded locking elements. Additional installation space is often required for this. Additional costs are also incurred.

A fastening device operating according to this locking principle is known, for example, from DE 4216413 A1.

In the second locking principle, the fastening device is equipped with immovable tension bolts (Z-bolts). The shear bolts (XY-bolts) are vertically movable and are in an upper end position before assembly. The fastening device is inserted into the seat rails from above so that the tension bolts enter the rail holes in the seat rail. Then the fastening device is moved to the locking position by half a hole spacing in the longitudinal (horizontal) direction of the perforated rail, usually by ½ inch. As this occurs, the locking head of the tension bolt engages the profile edges (Z-lip) of the slots in the seat rail to secure the fastening device in the Z-direction. Securing in the XY-plane is achieved by moving the shear bolts vertically to the lower end position and locking them in place.

A fastening device operating according to this locking principle is known from WO 2010/149178 A1, wherein the shear bolts are implemented by screw-in fixing pins. Locking in the Z-direction is ensured by extensions of a fastening rail which are made in one piece with the housing.

Solutions other than the use of screw bolts for axial displacement of the shear bolt typically have the disadvantage that additional components are required and more installation space, in particular a greater overall height, is needed.

To save weight, the housing of the fastening device is usually made of aluminum. The diameters of the shear bolts and tension bolts must be designed to be sufficiently large depending on the loads that occur. At the same time, the aluminum housing must have a correspondingly large material thickness for sufficient strength. Tension bolts and shear bolts made of aluminum can only be used for relatively low loads. For applications in which high loads act on the fastening device, steel tension bolts are sometimes provided for locking in the Z-direction, which are screwed into the housing.

If a shear bolt is screwed into the housing of the fastening device, a housing recess must be provided for the shear bolt with a circular cross-section that corresponds (at least) to the diameter of the shear bolt. Due to the grid dimension of the perforated rail, the maximum remaining material thickness of the housing between a housing recess for a screwed-in tension bolt and the housing recess for the shear bolt is limited. With this solution, screwed-in steel tension bolts cannot be used because the remaining material thickness for screwing the steel bolt into the aluminum housing is too small. This limits the maximum permissible load for the fastening device.

SUMMARY

The present invention sets itself the object of providing a fastening device for releasable connection to a perforated rail of an aircraft, which can transmit the highest possible loads and at the same time has the lowest possible space requirement, in particular the lowest possible overall height. Furthermore, the fastening device is to be as simple as possible from a constructive standpoint and suitable for safety-relevant applications. In addition, a method of assembly for detachably connecting such a fastening device to a perforated rail of an aircraft is to be proposed.

This object is solved by a fastening device and by a method of assembly of the present disclosure.

In particular, the object is solved by a fastening device for releasable connection to a perforated rail, preferably a seat rail, of an aircraft, wherein the perforated rail comprises rail holes which are spaced apart from one another in the longitudinal direction in a grid dimension and are connected to one another by rail slots, wherein the fastening device comprises:

- a housing, preferably made of aluminum,
- at least one locking head portion fixedly connected to the housing, wherein the locking head portion is insertable into a rail hole of the perforated rail and displaceable along the longitudinal direction of the perforated rail to a locking position in which the locking head portion is engaged with a slot portion of the perforated rail in which a rail slot extends;
- at least one shear pin, preferably made of aluminum, which is guided in the housing so as to be non-rotatable and axially displaceable relative to the housing, wherein the shear pin can be brought into engagement with a rail hole of the perforated rail in a locking position of the fastening device by axial displacement;
- an actuating pin which is rotatably arranged relative to the housing and connected to the shear pin in such a way that a rotation of the actuating pin causes an axial displacement of the shear pin relative to the housing.

The idea of the invention is, on the one hand, to keep the space requirement of the fastening device as small as possible by means of an actuating pin which is rotatable relative to the housing. By means of a shear pin which is non-rotatable relative to the housing, but which is axially displaceable relative to the housing, the rotational position of the shear pin (about its longitudinal axis) is fixed. As a result, the cross-section of the shear pin can deviate from a circular cross-section—which would be mandatory if the shear pin were rotatable in the housing—and can be suitably designed depending on the structural-mechanical strength requirements. In this way, a fastening device can be designed in such a way that, on the one hand, it can transmit the highest possible loads and, on the other hand, has the lowest possible space requirement, in particular a low overall height.

The fastening device functions in particular according to the second locking principle described above, i.e. preferably on the basis of a displacement of the fastening device in the longitudinal direction of the perforated rail by half a grid dimension into a locking position. The shear pin is displaced in particular along its longitudinal direction, i.e. perpendicular (in the Z-direction) to the perforated rail when the fastening device is mounted. The shear pin serves in particular to block relative movement between the fastening device and the perforated rail in the longitudinal direction (X-direction) and transverse direction (Y-direction) of the perforated rail, while the locking head portion serves in particular to block relative movement perpendicular to the perforated rail (Z-direction).

In particular, the shear pin is positively secured against rotation in the housing. A shear pin can have a non-rotationally symmetrical cross-section and be axially guided in a correspondingly shaped guide recess of the housing. The locking head portion can be made in one piece with the housing (of aluminum) or as part of a locking bolt (tension bolt) as a separate component (e.g. of steel).

The rotatable arrangement of the actuating pin relative to the housing and the connection of the actuating pin to the shear pin is implemented in particular by a mechanism for converting a rotational movement of the actuating pin into an axial movement of the shear pin. Such a mechanism may comprise a single-start or multiple-start thread or a (spiral) link guide. The actuating bolt could be rotatably arranged in the housing (axially displaceable relative to the housing) via a thread, with the actuating bolt being axially non-displaceable but rotatably connected to the shear pin. Alternatively, the actuating pin could be rotatably and axially non-displaceably disposed relative to the housing, with the actuating pin connected to the shear pin via a thread. A rotatable actuating bolt allows axial displacement of the shear pin by simple design means. Additional, especially complex, components for a displacement mechanism of a shear pin known in the prior art, such as compression springs, quick-release nuts or rocker arms, can be dispensed with.

A perforated rail (seat rail) may comprise a plurality of rail holes (bores) or a relatively short series of (some) rail holes, for example two to six rail holes. A so-called fitting with rail holes and rail slots provided in a cargo deck can also be understood as a (short) perforated rail.

In one embodiment, the shear pin is accommodated in a guide recess of the housing, wherein an inner contour portion of the guide recess is adapted to the shape of an outer contour portion of the shear pin. The inner surface section serves in particular to guide the shear pin axially. As a result, by suitably shaping the outer contour (cross-section) of the shear pin, the housing can be optimized by a correspondingly adapted design of the guide recess according to structural-mechanical criteria, in particular with regard to strength.

In one embodiment, the cross-section of the shear pin has a first cross-sectional dimension in at least a first outer contour portion and a second, smaller cross-sectional dimension in at least a second outer contour portion, wherein the second outer contour portion is aligned with the locking head portion of the shear pin. For example, the cross-section of the shear pin may be rectangular or have a groove open toward the locking head portion. In particular, the shear pin has a cross-sectional reduction in the circumferential portion oriented toward the locking head portion relative to the outer circumferential contour of the shear pin. The smaller cross-sectional dimension may be fabricated by milling out one or both sides of the shear pin. The cross-section of the shear pin may be kidney-shaped. By reducing the cross-section in sections (reducing the radius), on the one hand a non-rotationally symmetrical cross-section can be created which prevents the shear pin from twisting in the housing. On the other hand, the housing can be made with greater material thickness in the area of the cross-section reduction of the shear pin by a corresponding widening of the housing (reinforcement of a housing wall), which increases the strength.

In one embodiment, an outer contour portion of the cross-section of the shear pin aligned with the locking head portion of the shear pin, in particular the second outer contour portion of the cross-section of the shear pin, is shaped inwardly curved, preferably in the shape of a circular arc, wherein in particular the first outer contour portion of the cross-section of the shear pin is shaped outwardly curved, preferably in the shape of a circular arc. In particular, a first outer contour portion is concave and a second outer contour portion is convex. By having an inwardly curved circumferential surface of the shear pin, the outer surface of the housing can be made outwardly curved in this region. As a result, the housing can have more material in the region of the longitudinal axis of the locking head portion, i.e. can be designed with greater wall thickness. This increases the mechanical strength of the housing, especially in this area.

In one embodiment, the locking head portion is a portion of a locking bolt fixed in the housing, wherein the locking bolt is preferably made of steel. The locking bolt is preferably screwed into the housing along a threaded portion. Especially for safety-related applications, a locking bolt designed as a screw bolt can be mounted with a defined tightening torque. In addition, the thread between the housing and the threaded portion of the locking bolt can be secured by an (approved) thread coating to provide additional security against backdriving. By means of a locking bolt made of a stronger material, such as preferably steel, screwed into an aluminum housing, the mechanical load capacity of the fastening device can be increased, in particular with regard to the transmittable tensile forces.

In one embodiment, an outer contour portion of the cross-section of the shear pin aligned with the locking head portion of the shear pin and an outer contour of the locking head portion, in particular an outer contour of the threaded portion of the locking bolt, are formed concentrically with one another. As a result, the housing wall area between the shear pin and the threaded portion of the locking bolt can be designed with greater wall thickness precisely in the area where a mechanical load caused by screwing the locking bolt into the housing is particularly high.

In one embodiment, the actuating pin is rotatably received in a through-hole of the housing via a thread. The actuating bolt is designed in particular as a screw bolt.

In one embodiment, the actuating pin is firmly connected to the shear pin in the axial direction, preferably in a positive-locking manner, wherein the actuating pin and the shear pin are secured against relative axial displacement in particular by a locking element, preferably a locking pin or a locking ring. The actuating bolt can have at least one circumferential groove, into which (in each case) a retaining ring is inserted. Due to a fixed axial connection (along a common longitudinal axis) of the actuating pin and the shear pin, the shear pin follows the axial displacement of the actuating pin in both directions, wherein the shear pin itself is guided nonrotatably in the housing.

In one embodiment, the actuating pin has a circumferential groove and the shear pin has at least one transverse bore, wherein a locking element, preferably a locking pin, engages in the circumferential groove and in the transverse bore. The shear pin can have transverse bores in on both sides, wherein a locking pin can be inserted in the transverse bore in each case. Axial securing by means of a locking pin ensures that the actuating pin can be rotated relative to the shear pin and, at the same time, that the shear pin is axially secured in a simple manner from the point of view of production technology.

In one embodiment, a housing surface of the housing, forms a first axial stop surface for an upper end surface of the shear pin, wherein contact of the first axial stop surface and the upper end surface define an upper axial end position of the shear pin. The first axial stop surface is provided in particular on an inner side of the guide recess.

In one embodiment, the actuating pin has a head portion with a driving profile for rotating the actuating pin. The driving profile can, for example, be a hexagon socket profile. A head portion with a driving profile is space-saving and requires only a low overall height.

In one embodiment, a housing outer surface of the housing forms a second axial stop surface for a lower bearing surface of the head portion of the actuating pin, wherein contact of the second axial stop surface and the lower bearing surface define a lower axial end position of the shear pin. The (annular) upper end surface of the shear pin may be formed by an axial (annular) projection of the shear pin that is flush with (or is a portion of) the outer circumferential surface of the shear pin. This increases the circumferential contact area for transferring shear forces introduced into the shear pin into the housing.

In one embodiment, a threaded portion of the actuating pin is engaged with the thread of the housing in a lower axial end position of the shear pin and is not engaged with the thread of the housing in an upper axial end position of the shear pin. In particular, the threaded portion of the actuating pin has an external thread, and a through-hole of the housing has an internal thread. In particular, the length of the threaded portion of the actuating pin is such that the threaded portion is disengaged from the housing in the upper axial end position of the shear pin. In this way, an unintentional (axial) overloading or overcoming of the axial securing between the shear pin and the actuating bolt, in particular by a locking element, can be prevented.

In one embodiment, one shear pin is provided on each side of the locking head portion, with the longitudinal axes of the two shear pins being spaced apart by a latching dimension of the perforated rail. Two shear pins can prevent rotation of the fastening device about the longitudinal axis of the locking head portion (Z-direction). This prevents or at least reduces a heavy load on the locking bolt.

In one embodiment, at least one folding fastening element, in particular for fixing cargo containers and/or cargo pallets on a cargo deck of an aircraft, is fastened to the housing such that it can be folded up and down, wherein the actuating bolt is positioned at least partially below the folding fastening element in a folded-down position of the folding fastening element. In particular, the actuating bolt can be rotated in an unfolded position of the folding fastening element. The low overall height due to the use of a rotatable actuating bolt allows the folding fastening element to be completely folded down. This preferably allows a predetermined maximum overall height for the fastening device, such as 2 inches, to be maintained.

Furthermore, the object is solved in particular by a method of assembly for releasably connecting a fastening device according to the invention to a perforated rail, preferably a seat rail, of an aircraft, wherein the perforated rail comprises rail holes which are spaced apart from one another in the longitudinal direction in a grid dimension and are connected to one another by rail slots, wherein the method of assembly comprises the steps of:
  inserting the locking head portion of the fastening device into a rail hole of the perforated rail;
  displacing the fastening device by half a grid dimension along the longitudinal direction of the perforated rail to a locking position in which the locking head portion is in engagement with a slot portion of the perforated rail;
  rotating the actuating pin relative to the housing, preferably by engaging a suitable tool in a driving profile of the actuating pin, to move the shear pin axially to a lower axial end position in which the shear pin engages in a rail hole of the perforated rail.

The method of assembly has similar advantages to the fastening device according to the invention. The method may implement some or all of the procedural features described in connection with the fastening device.

BRIEF DESCRIPTION OF THE DRAWINGS

Exemplary embodiments of the invention are explained in more detail below with reference to the drawings, wherein.

In the following description of the invention, the same reference signs are used for elements that are the same and have the same effect.

DETAILED DESCRIPTION

Figure 5:
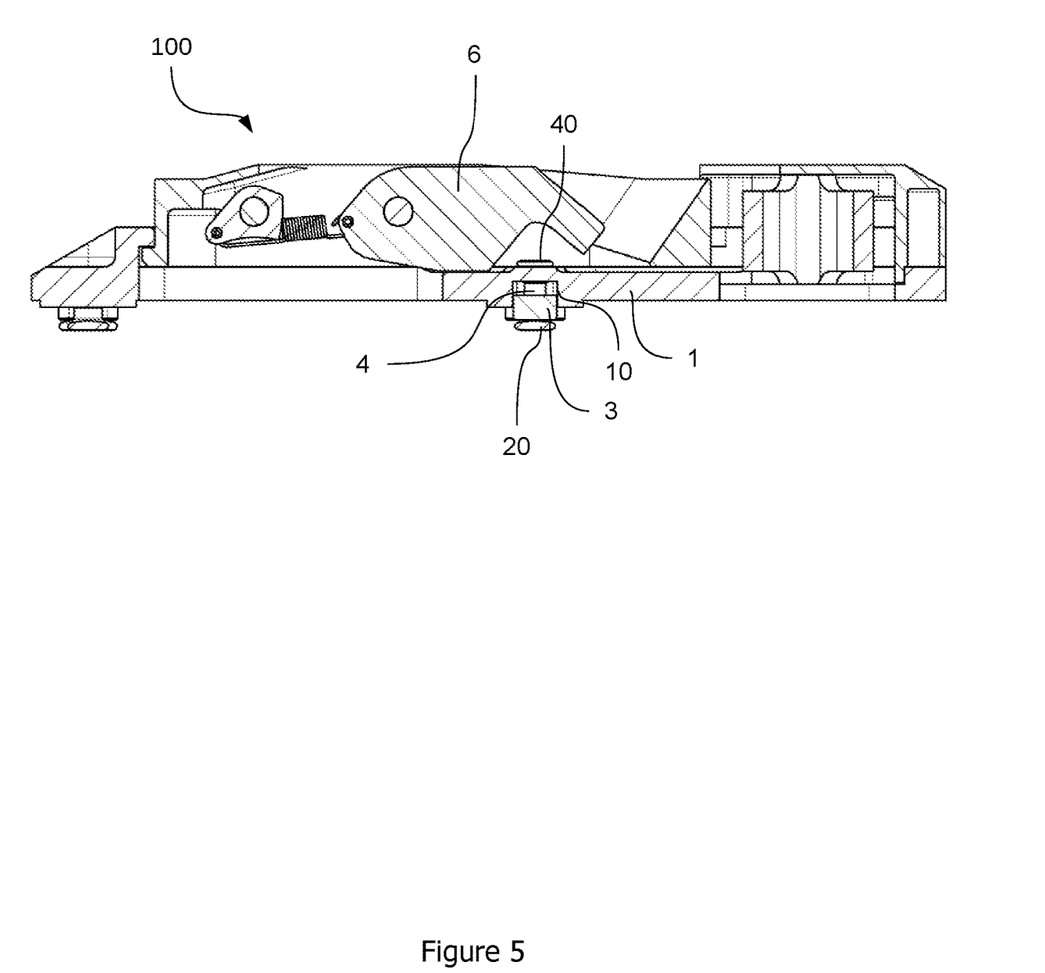
FIG. 5 shows a schematic representation of a first embodiment of a fastening device according to the invention having a folding fastening element in a lateral sectional view.
Figure 6A:
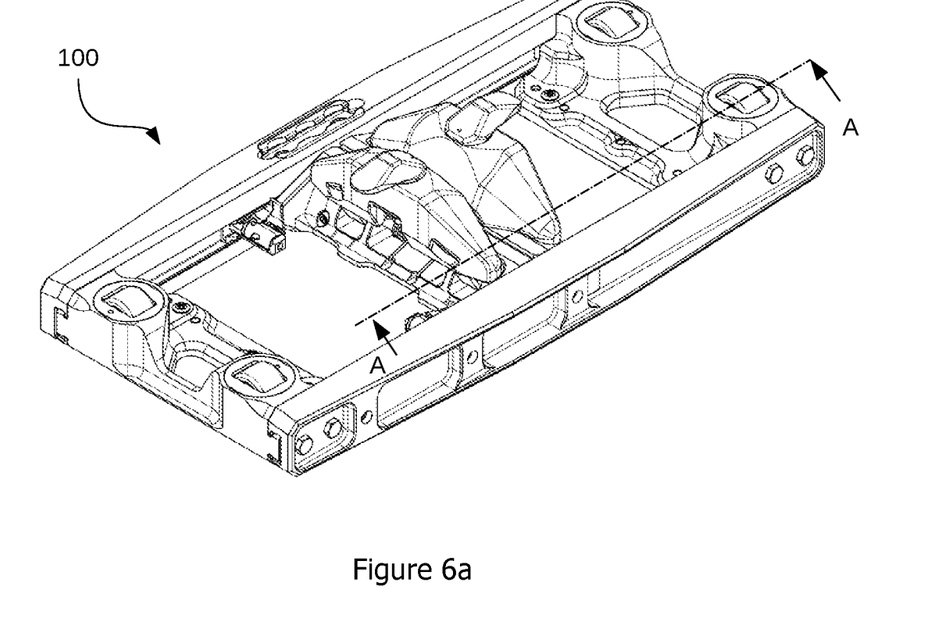
FIG. 6a shows a schematic representation of a second embodiment of a fastening device according to the invention having a folding fastening element in a perspective view.
Figure 6B:
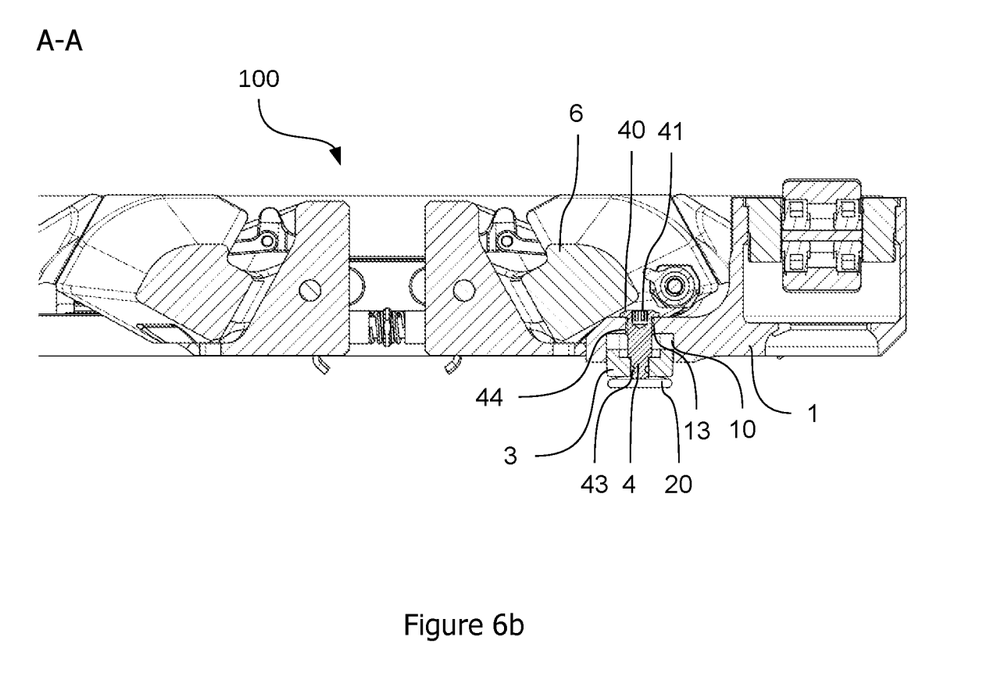
FIG. 6b shows the embodiment according to FIG. 6A in a lateral sectional view along line A-A.

FIGS. 1 to 5 show a first embodiment of a fastening device 100 according to the invention for releasable connection to a perforated rail 200. Further embodiments are shown in FIGS. 5 and 6a and 6b.

Figure 7A:
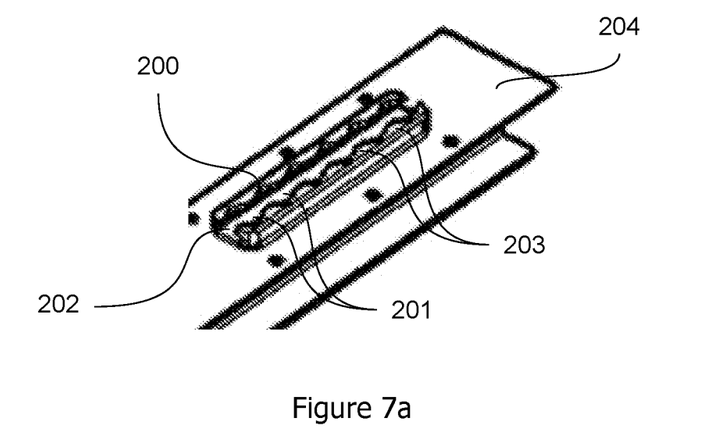
FIG. 7a shows a schematic representation of a common perforated rail in perspective view.
Figure 7B:
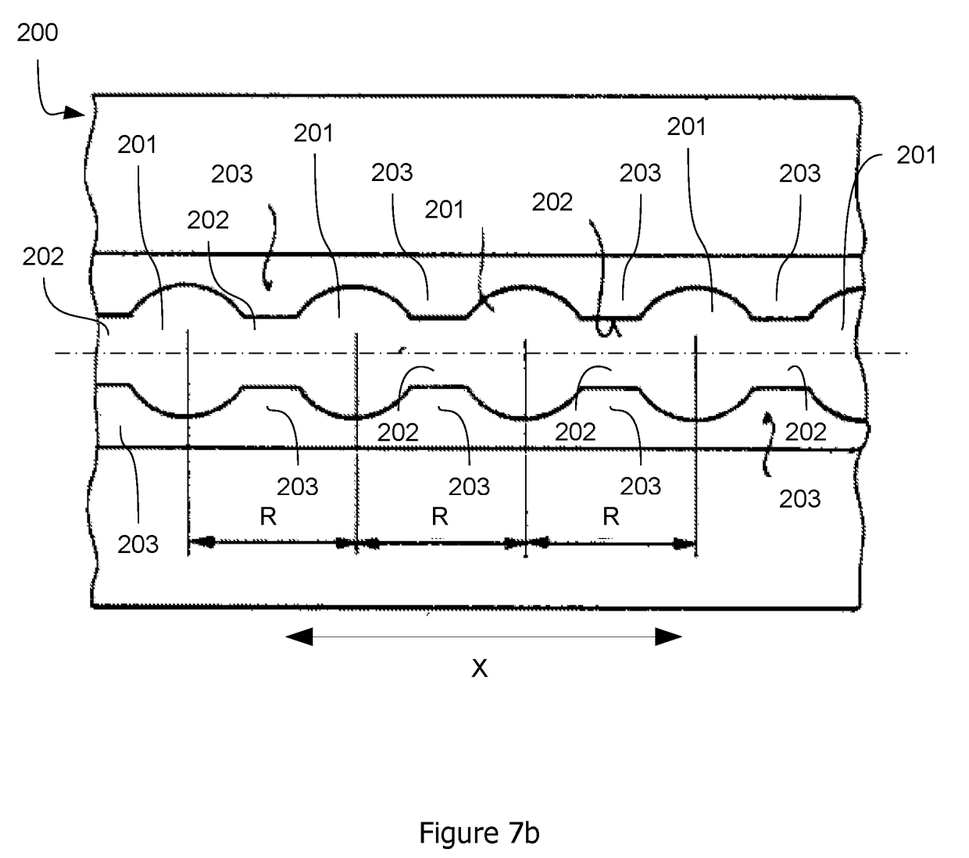
FIG. 7b shows a schematic representation of a section of a common perforated rail in a plan view.

A perforated rail 200 known from the prior art is shown schematically in FIGS. 7a and 7b. Such perforated rails 200 are used in aircraft for securing passenger seats and cargo by means of fastening devices. A perforated rail 200 having a standardized T-slot profile is fixedly mounted on a carrier profile 204 which is connected to the aircraft fuselage. The perforated rail 200 has a plurality of spaced-apart rail holes 201 in the longitudinal direction X at grid dimension R, typically 1 inch, which are interconnected by rail slots 202. Between the rail holes 201, the slot portions 203 form profile edges projecting toward the center of the rail profile.

The embodiment of the fastening device 100 shown in FIGS. 1-5 has a housing 1 made of aluminum, into which a locking bolt 2 made of steel with a locking head portion 20 is screwed. For this purpose, the locking bolt 2 has a driving profile 23, in this case an internal hexagonal profile, and a threaded portion 22 extending along the longitudinal axis C and having an external thread. The diameter of the locking head portion 20 is smaller than the diameter of a rail hole 201, but sufficiently large to positively engage behind the profile edges of a slot portion 203 of the hole rail 200 in the locking position P. The shear pin 3 is guided in a guide recess 10 of the housing 1 so as to be axially displaceable, i.e. along its longitudinal axis B, along the outer circumferential surface 30. The shear pin 3 is preferably made of aluminum and has a basic cylindrical shape with a non-rotationally symmetrical cross-section (see FIGS. 2, 3b and 4), in this case a circular shape with cutouts on both sides. Due to the fact that the inner contour portion 11 of the guide recess 10 is adapted to the shape of the outer contour portion 31, 32 of the shear pin 3, the shear pin 3 cannot rotate in the housing 1. The actuating pin 4 has a threaded portion 44 that engages with a thread 13 of the housing 1 formed in the through-hole 12. The actuating pin 4 is rotatably arranged in the housing 1 and connected to the shear pin 3 such that rotation of the actuating pin 4 causes axial displacement of the shear pin 3. The mechanism for converting the rotational movement into the axial movement includes a circumferential groove 43 of the actuating pin 4, and a locking element 5 inserted into a transverse bore 33 of the shear pin 3. The locking element 5 is designed as a locking pin that blocks relative axial movement while allowing relative rotatability between the actuating pin 4 and the shear pin 3. This allows the shear pin 3 to be moved back and forth in the axial direction between an upper axial end position S1 and a lower axial end position S2, while its rotational orientation does not change. At least one locking ring could also be provided as a locking element 5. The shear pin 3 could have substantially parallel transverse bores 33 on both sides, into each of which a locking element 5 is inserted. This solution for axial displacement of the shear pin 3 requires only a small amount of space and, in particular, has a small overall height above the housing 1.

Figure 1:
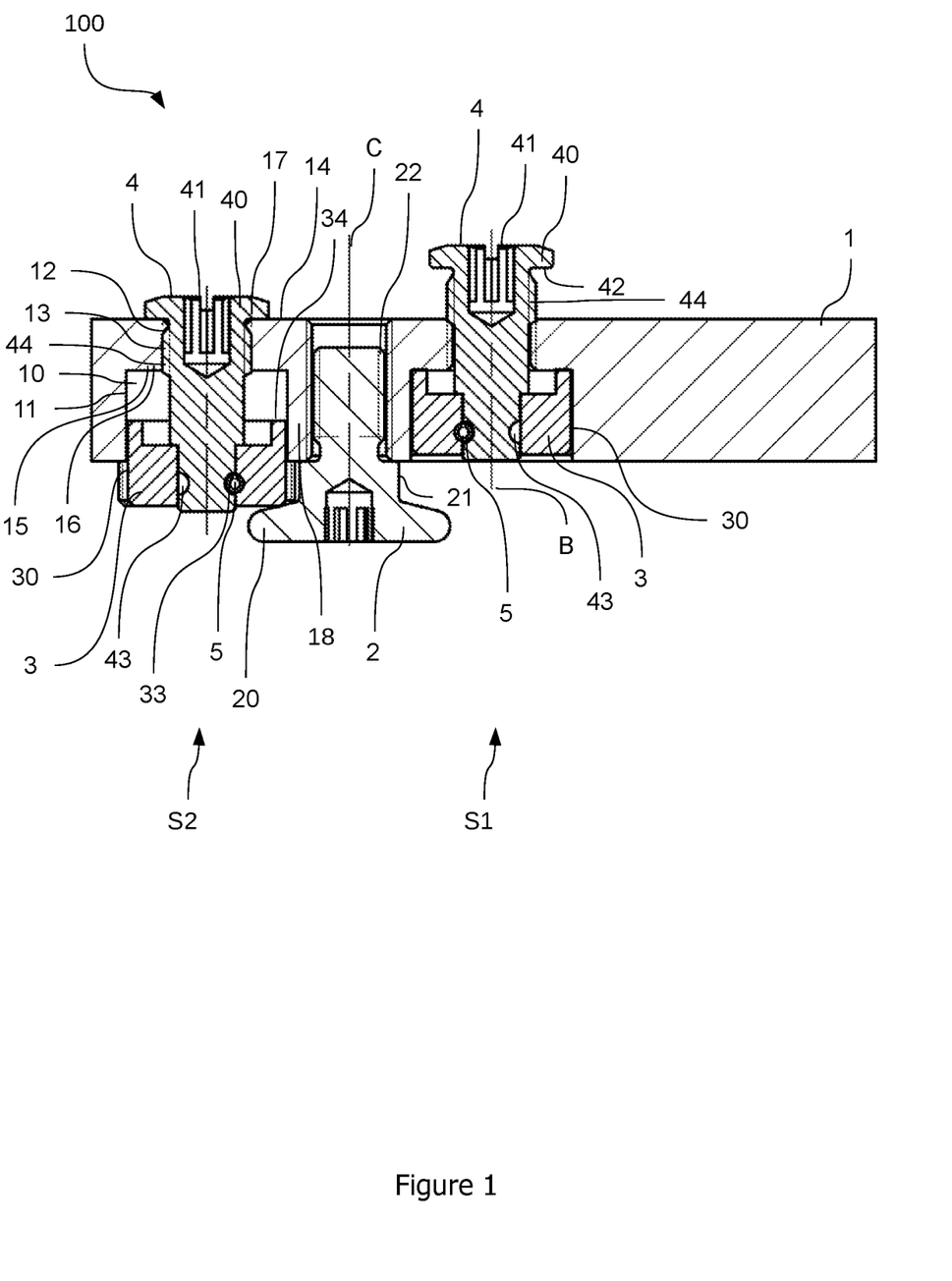
FIG. 1 shows a schematic representation of an embodiment of a fastening device according to the invention in a lateral sectional view.
Figure 2:
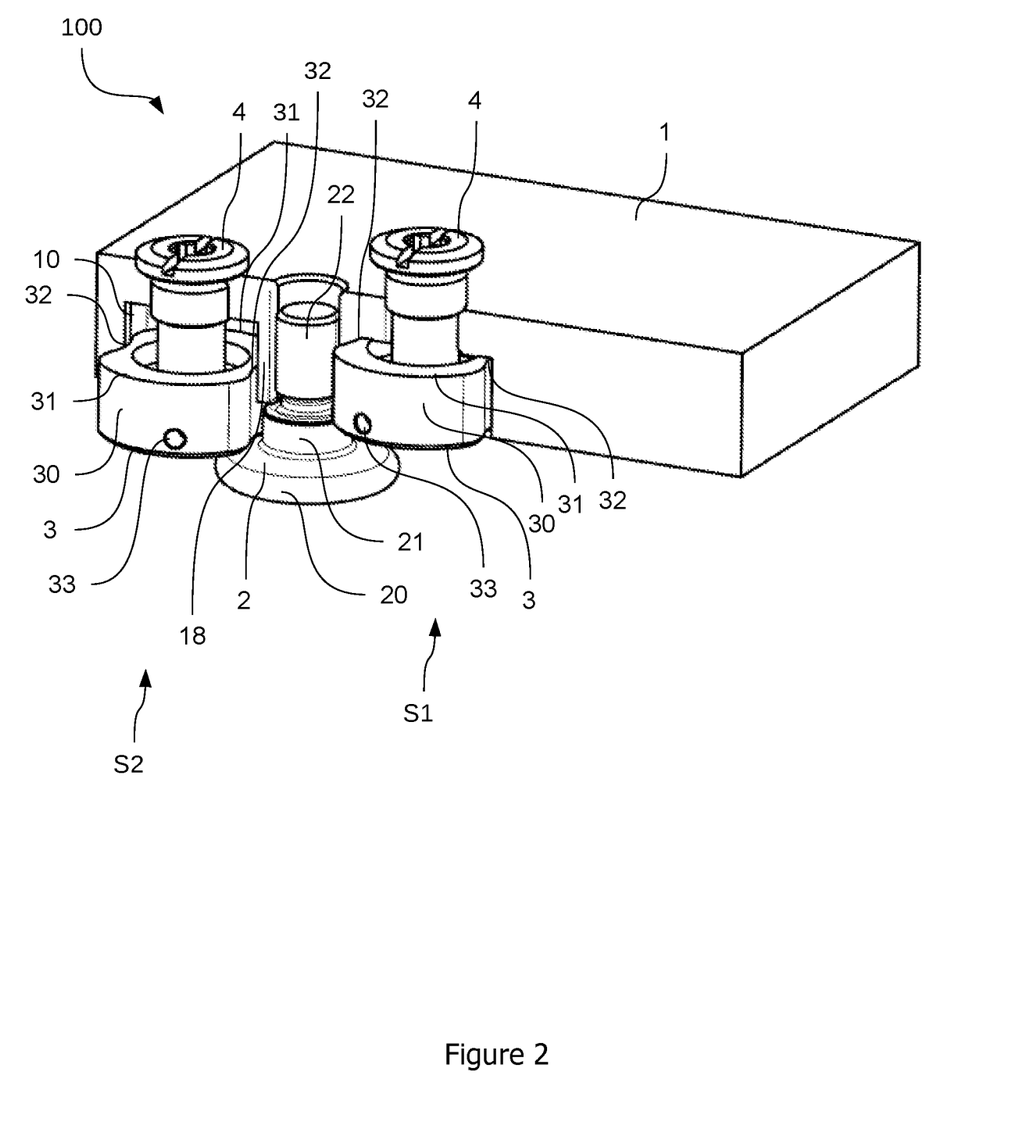
FIG. 2 shows a partial perspective view of the embodiment according to FIG. 1.
Figure 3A:
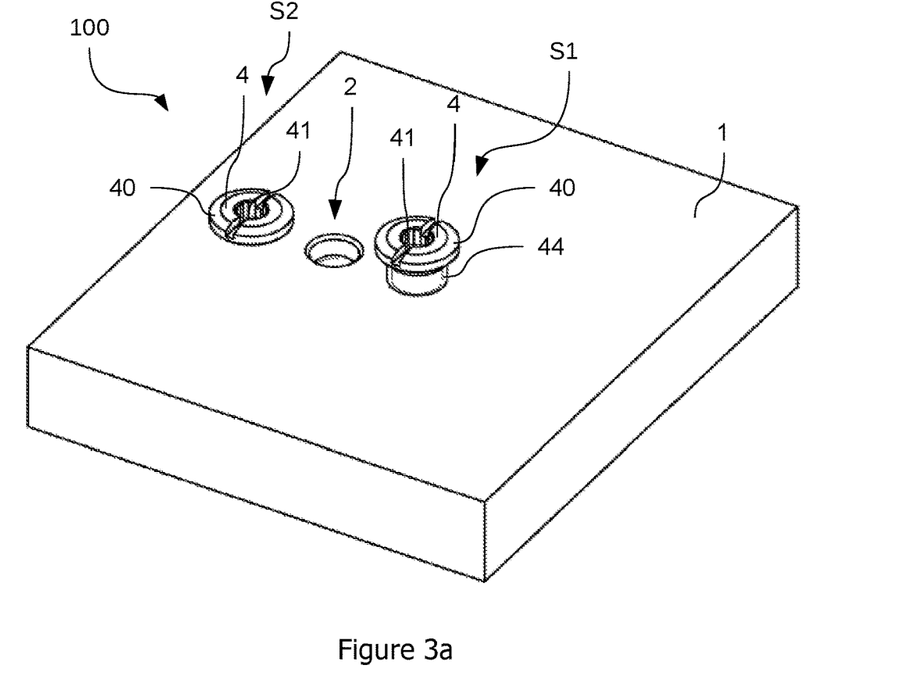
FIG. 3a shows the embodiment according to FIG. 1 in perspective plan view.
Figure 3B:
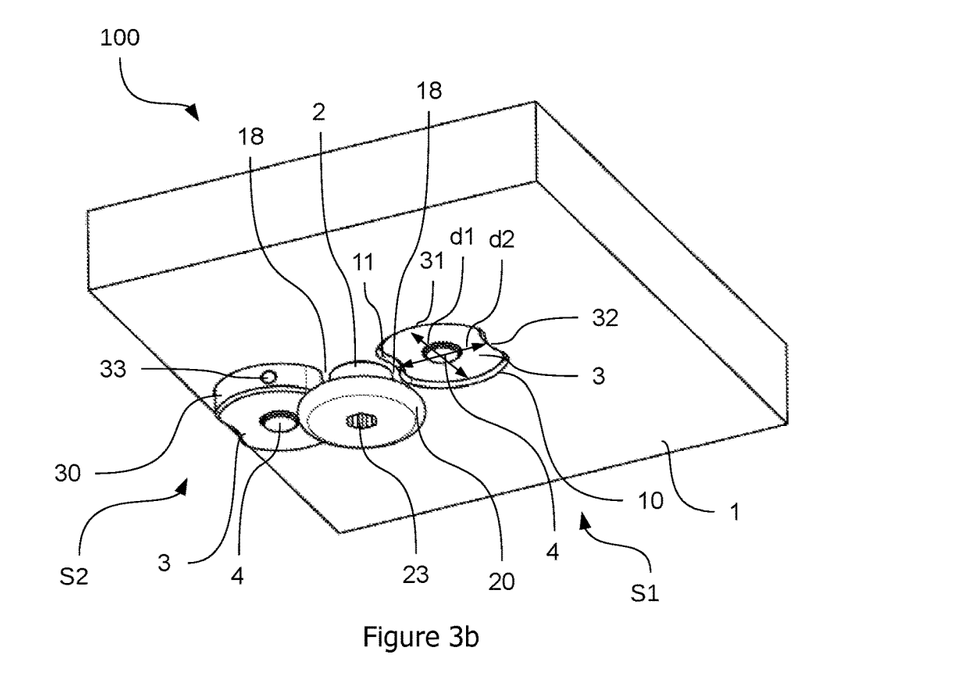
FIG. 3b shows the embodiment according to FIG. 1 in perspective bottom view.
Figure 4:
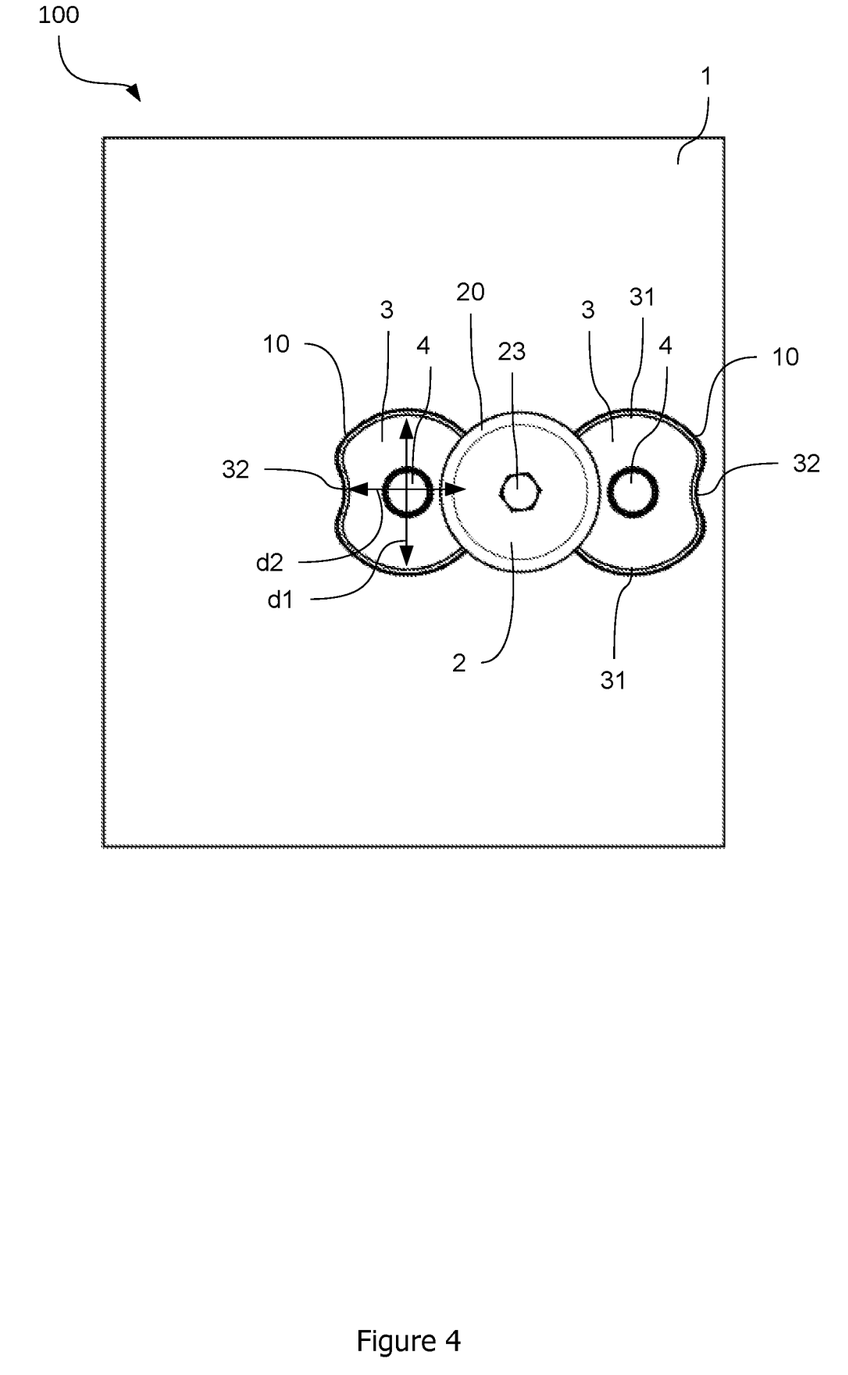
FIG. 4 shows a bottom view of the embodiment shown in FIG. 1.

The housing surface 15 forms a first axial stop surface 16 for the upper end surface 34 of the shear pin 3, thereby defining the upper axial end position S1 of the shear pin 3. The housing outer surface 14 forms a second axial stop surface 17 for the lower bearing surface 42 of the head portion 40 of the actuating pin 4, thereby defining the lower axial end position S2 of the shear pin 3. In order to prevent unintentional overloading of the axial connection between the actuating bolt 4 and the shear pin 3 by axial tensioning, or even loosening of the axial securing, the threaded portion 44 is sufficiently short, for example between 2 and 5 mm, wherein the entire actuating pin 4 has a length of approximately 20 mm. As a result, the threaded portion 44 comes out of engagement with the thread 13 in the upper axial end position S1. Overstressing of the locking element 5 is thus prevented.

Due to the predetermined grid dimension R of the perforated rail 200, the available installation space for the fastening device 100 is limited. While the grid dimension R corresponds to the distance between the longitudinal axes B of the two shear pins 3, the distance between the longitudinal axis C of the locking bolt 2 and a shear pin 3 is half a grid dimension R/2. In order to enable the fastening device 100 to transmit a certain permissible load to the perforated rail 200, the locking bolt 2 and the shear pin 3 in particular must be dimensioned sufficiently large accordingly. The larger the cross-sections of the shear pin 3 and the locking bolt 2, in particular the diameter of the threaded portion 22, are selected, the smaller the remaining material thickness of the housing 1 in the housing wall region 18 between the guide recess 10 and the threaded hole for the locking bolt 2. By preventing the shear pin 3 from twisting relative to the housing 1 in the fastening device 100, its cross-section can be optimized with respect to the structural mechanical strength of the housing 1.

According to the exemplary embodiment, the cross-section of the shear pin 3 has the first cross-sectional dimension d1 in a first outer contour portion 31 and the smaller second cross-sectional dimension d2 in the second outer contour portion 32. The second outer contour portion 32, in the region of which the cross-section is reduced, is oriented towards the locking head portion 20 of the shear pin 3. Between the two second outer contour portions 32 formed on both sides, the first outer contour portions 31 are arranged, which correspond to an imaginary circular cross-section of the shear pin 3. The first outer contour portion 31 corresponds to an outwardly curved (convex) circular arc, the diameter d1 being approximately 18-19 mm, for example. The second outer contour portion 32 corresponds to an inwardly curved (concave) circular arc, having a radius of 5-6 mm, for example. The diameter d2 is approximately 14 mm, for example. Between the first outer contour portion 31 and the second outer contour portion 32, the outer circumferential surface 30 extends continuously, for example with a transition radius of 3-4 mm. The total cross-sectional reduction in this exemplary embodiment with cross-sectional reduction on both sides by milling out the shear pin 3 in the region of the second outer contour portion 32 is approximately 4-6 mm. Accordingly, the housing wall region 18 can be made 2 to 3 mm thicker, i.e. with greater wall thickness, which increases the strength of the housing 1 sufficiently to allow a locking bolt 2 made of steel to be securely screwed into the housing 1. The second outer contour portion 32 and the outer contour of the threaded portion 22 of the locking bolt 2 are preferably aligned substantially concentrically with one another, so that the material thickness in the housing wall region 18 can be achieved symmetrically over the angular region of the threaded portion 22 (relative to the longitudinal axis C) that is aligned towards the shear pin 3.

The embodiments of fastening devices 100 shown in FIGS. 5 and 6a and 6b each have folding fastening elements 6, which are folding and unfolding locks for fastening containers and pallets for cargo on a cargo deck of an aircraft. In order that the containers and pallets supported by rollers can be moved unhindered on the cargo deck—in the state not yet secured by the fastening device 100—a permissible maximum height, for example of 2 inches, of the fastening device 100 must not be exceeded in the folded-down state of the folding fastening elements 6. In order to be able to fold down the folding fastening elements 6 as flat as possible in the direction of the housing 1, the mechanism for axial displacement of the shear pin 3 must have the lowest possible overall height. By designing the actuating pin 4 in a space-saving manner as a screw bolt with a head portion 40 having a driving profile 41, the actuating pin 4 protrudes only relatively slightly above the housing surface 15, thus ensuring the required low overall height.

A method of assembly for releasably connecting the fastening device 100 according to the invention is described below. For releasable connection of a fastening device 100 to the perforated rail 200 according to the second locking principle described at the beginning, the fastening device 100 is displaced from an initial position to a locking position P. In the locking position P, the push pins 3 engage the rail holes 201 to block movement in the XY-direction, while the locking head portion 20 engages behind the profile edges of a slot portion 203 to prevent movement in the Z-direction (perpendicular to the drawing plane in FIG. 7b). For this purpose, in the initial position, while the shear pin 3 is in the upper axial end position S1, the fastening device 100 is first inserted into a rail hole 201 with the locking head portion 20 of the locking pin 2 (tension bolt) and then displaced in the longitudinal direction X by half a grid length R, i.e. typically by ½ inch, to the locking position P. Then the shear pin 3 is moved by actuation, namely rotation, of the actuating bolt 4 to the lower axial end position S2, in which it engages positively in a rail hole 201.

The fastening device 100 according to the invention achieves the transmission of high loads by structurally simple means and at the same time has a low space requirement, in particular a low overall height.

At this point it should be pointed out that all the parts described above are to be regarded in each case individually—even without features additionally described in the respective context, even if these have not been explicitly identified individually as optional features in the respective context, e.g. by using: in particular, preferably, for example, optionally, round brackets, etc.—and in combination or any subcombination as independent designs or further developments of the invention as defined in particular in the introduction to the description and in the claims. Deviations therefrom are possible. Specifically, it should be noted that the word in particular or round brackets do not indicate features that are mandatory in the respective context.

LIST OF REFERENCE SIGNS

1 Housing
2 Locking bolt
3 Shear pins
4 Actuating bolt
5 Locking element
6 Folding fastening element
10 Guide recess
11 Inner contour portion
12 Through-hole
13 Thread
14 Housing outer surface
15 Housing surface
16 First axial stop surface
17 Second axial stop surface
18 Housing wall region
20 Locking head portion
21 Shaft portion
22 Threaded portion
23 Driving profile
30 Outer circumferential surface
31 First outer contour portion
32 Second outer contour portion
33 Transverse bore
34 Upper end surface
40 Head portion
41 Driving profile
42 Lower bearing surface
43 Circumferential groove
44 Threaded portion
100 Fastening device
200 Perforated rail
201 Rail hole
202 Rail slot
203 Slot portion
204 Carrier profile
d1 First cross-sectional dimension
d2 Second (smaller) cross-sectional dimension
X Longitudinal direction of the perforated rail
B Longitudinal axis of the shear pin and actuating pin
C Longitudinal axis of the locking bolt
R Grid dimension
P Locking position
S1 Upper axial end position of the shear pin
S2 Lower axial end position of the shear pin

The invention claimed is:

1. A fastening device for releasable connection to a perforated rail of an aircraft, wherein the perforated rail comprises rail holes spaced apart from one another in a longitudinal direction by a grid dimension and connected to one another by rail slots, wherein the fastening device comprises:
   a housing,
   at least one locking head portion fixedly connected to the housing, wherein the locking head portion is insertable into one of the rail holes of the perforated rail and displaceable along the longitudinal direction of the perforated rail to a locking position in which the locking head portion is engaged with a slot portion of the perforated rail in which one of the rail slots extends;

at least one shear pin which is guided in the housing so as to be non-rotatable and axially displaceable relative to the housing,
wherein the shear pin can be brought into engagement with one of the rail holes of the perforated rail in a locking position of the fastening device by axial displacement;

an actuating pin, which is rotatably arranged relative to the housing and connected to the shear pin in such a way that a rotation of the actuating pin causes an axial displacement of the shear pin relative to the housing,
wherein the actuating pin has a circumferential groove and the shear pin has at least one transverse bore, and
wherein a locking element engages the circumferential groove and the transverse bore.

2. The fastening device according to claim 1, wherein the shear pin is accommodated in a guide recess of the housing, wherein an inner contour portion of the guide recess is adapted to the shape of an outer contour portion of the shear pin.

3. The fastening device according to claim 1, wherein the cross-section of the shear pin has a first cross-sectional dimension in at least a first outer contour portion and a second, smaller cross-sectional dimension in at least a second outer contour portion, wherein the second outer contour portion is aligned with the locking head portion of the shear pin.

4. The fastening device according to claim 3, wherein the second outer contour portion is curved inwardly, and wherein the first outer contour portion is curved outwardly.

5. The fastening device according to claim 4, wherein the locking head portion is a portion of a locking bolt, wherein the locking bolt is fixed in the housing.

6. The fastening device according to claim 5, wherein the first and second outer contour portions are formed concentrically with each other.

7. The fastening device according to claim 6, wherein the first outer contour portion is an outer contour of a threaded portion of the locking bolt.

8. The fastening device according to claim 4, wherein the second outer contour portion is curved inwardly and circular arc-shaped, and wherein the first outer contour portion is curved outwardly and circular arc-shaped.

9. The fastening device according to claim 1, wherein the actuating pin is rotatably received in a through-hole of the housing via a thread.

10. The fastening device according to claim 9, wherein a threaded portion of the actuating pin is engaged with the thread of the housing in a lower axial end position of the shear pin and is not engaged with the thread of the housing in an upper axial end position of the shear pin.

11. The fastening device according to claim 1, wherein the actuating pin is firmly connected to the shear pin in the axial direction, wherein the actuating pin and the shear pin are secured against relative axial displacement by the locking element.

12. The fastening device according to claim 11, wherein the locking element is a locking pin.

13. The fastening device according to claim 1, wherein a housing surface of the housing forms a first axial stop surface for an upper end surface of the shear pin, wherein contact of the first axial stop surface with the upper end surface defines an upper axial end position of the shear pin.

14. The fastening device according to claim 1, wherein the actuating pin has a head portion with a driving profile for rotating the actuating pin.

15. The fastening device according to claim 14, wherein a housing outer surface of the housing forms a second axial stop surface for a lower bearing surface of the head portion of the actuating pin, wherein contact of the second axial stop surface with the lower bearing surface defines a lower axial end position of the shear pin.

16. The fastening device according to claim 1, wherein the at least one shear pin includes at least two shear pins provided on respective sides of the locking head portion, wherein longitudinal axes of the two shear pins are spaced apart from one another by a grid dimension of the perforated rail.

17. The fastening device according to claim 1, wherein at least one folding fastening element is fastened to the housing such that it can be folded up and down, wherein the actuating pin is positioned at least partially below the folding fastening element in a folded-down position of the folding fastening element.

18. A method of assembly for releasably connecting a fastening device according to claim 1 to a perforated rail of an aircraft, wherein the perforated rail has rail holes spaced apart from each other in a longitudinal direction at a grid dimension and connected to each other by rail slots, wherein the method of assembly comprises the steps of:
inserting the locking head portion of the fastening device into one of the rail holes of the perforated rail;
displacing the fastening device by half a grid dimension along the longitudinal direction of the perforated rail to a locking position in which the locking head portion is in engagement with a slot portion of the perforated rail;
rotating the actuating pin relative to the housing to move the shear pin axially to a lower axial end position in which the shear pin engages in one of the rail holes of the perforated rail.

19. The fastening device according to claim 1, wherein the actuating pin extends along a longitudinal axis, wherein the transverse bore extends perpendicular to the longitudinal axis, and wherein the locking element engages the circumferential groove and the transverse bore to secure the shear pin against axial displacement relative to the actuating pin while allowing rotation of the actuating pin relative to the shear pin.

20. The fastening device according to claim 19, wherein the locking element is a locking pin.

* * * * *